United States Patent [19]
Puster

[11] 3,818,923
[45] June 25, 1974

[54] FLUID CONTROL DEVICE AND METHOD OF MAKING THE SAME

[75] Inventor: Louis M. Puster, Knoxville, Tenn.

[73] Assignee: Robertshaw Controls Company, Richmond, Va.

[22] Filed: Nov. 20, 1972

[21] Appl. No.: 307,860

[52] U.S. Cl............... 137/85, 137/627.5, 251/353
[51] Int. Cl... F16k 31/365, F15b 5/00, G05d 16/00
[58] Field of Search ....... 137/85, 627.5, 525, 525.3, 137/525.5, 223; 251/353, 331

[56] References Cited
UNITED STATES PATENTS

| | | | |
|---|---|---|---|
| 605,549 | 6/1898 | Johansson | 137/525 X |
| 3,106,321 | 5/1963 | Gorman | 251/353 X |
| 3,401,849 | 9/1968 | Weber | 251/353 X |
| 3,531,994 | 10/1970 | Caldwell | 137/223 |
| 3,575,190 | 4/1971 | Puster | 137/627.5 |

Primary Examiner—Alan Cohan
Assistant Examiner—Gerald A. Michalsky
Attorney, Agent, or Firm—Candor, Candor & Tassone

[57] ABSTRACT

A fluid control device having a housing provided with first and second chambers interconnected together by a valve seat. A flexible valve member is disposed in the first chamber for opening and closing the valve seat, the valve member and the housing being so constructed and arranged that the valve member itself has a bias that tends to cause the valve member to close the valve seat. A movable actuator is disposed in the second chamber and is adapted to project through the valve seat and engage against the valve member to urge the same away from the valve seat to open the valve seat in opposition to the bias of the valve member.

6 Claims, 4 Drawing Figures

FLUID CONTROL DEVICE AND METHOD OF MAKING THE SAME

This invention relates to an improved fluid control device, such as a fluid operated relay means, as well as to a method for making such a fluid control device and a system utilizing such a fluid control device.

It is well known from the U.S. Pat. No. 3,575,190, to Puster et al., that a fluid operated relay device can be provided wherein the main supply pressure chamber for the device is interconnected by a stationary valve seat to the branch chamber of the device and that a flexible valve means can be utilized for opening and closing the valve seat so that the branch pressure can be controlled for the purpose of operating a fluid operated device. The valve means is normally urged to its closed position by compression spring means acting against the valve means in direction toward the valve seat and the valve means is adapted to be moved to the open position thereof by an actuator disposed in the branch chamber and projecting through the valve seat to engage against the valve means to move the same to its open position in opposition to the compression spring means. Such an actuator comprises an exhaust valve seat that is adapted to interconnect the branch chamber to an exhaust chamber when such exhaust valve seat is moved away from the valve means to cause the same to be in an open condition thereof.

It is a feature of this invention to provide a fluid operated device of the above described type wherein the valve means for controlling the valve seat between the main pressure chamber and the branch pressure chamber is improved.

In particular, the improved valve means of this invention comprises an arrangement wherein the valve member itself is provided with a bias that causes the valve member to normally close the valve seat. This is accomplished by having engaging means in the main chamber of the device engaging against a flexible valve member to tend to cup the valve member against and about the valve seat so that the natural bias of the cupped valve member is to tend to flatten the same in a direction towards the valve seat whereby the valve member has a bias that normally closes the valve seat.

Accordingly, it is an object of this invention to provide an improved fluid control device having one or more of the novel features set forth above or hereinafter shown or described.

Another object of this invention is to provide a method for making such a fluid control device.

Another object of this invention is to provide a fluid control system utilizing such a fluid control device.

Other objects, uses and advantages of this invention are apparent from the reading of this description which proceeds the reference to the accompanying drawings forming a part thereof and wherein.

Figure 1:
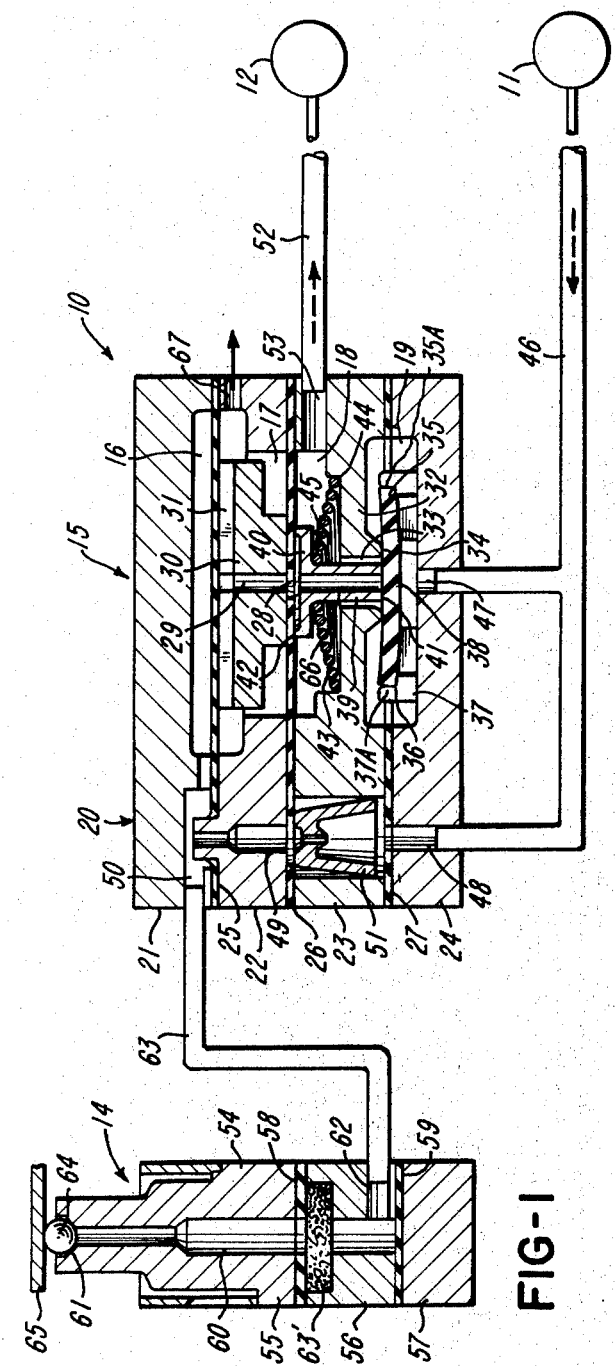
FIG. 1 is a schematic view illustrating the fluid control system utilizing the fluid control device of this invention that is illustrated in cross section.

While the various features of this invention are hereinafter described and illustrated as being particularly adapted to provide an improved valve means for a direct acting, fluid operated relay means, it is to be understood that the various features of this invention can be utilized singly or in any combination thereof to provide valve means for other fluid control devices as desired.

Therefore, this invention is not to be limited to only the embodiment illustrated in the drawings, because the drawings are merely utilized to illustrate one of the wide variety of uses on this invention.

Referring now to FIG. 1, a fluid control system is generally indicated by the reference numeral 10 and comprises a fluid supply means 11, a fluid operated device 12, a condition responsive fluid bleed means 14, and a fluid operated relay means or control device 15 of this invention having a pilot chamber 16, an exhaust chamber 17, a branch chamber 18, and a main chamber 19.

The relay means 15 is a direct acting relay means so that when the fluid pressure in the pilot chamber 16 increases, the fluid pressure in the branch chamber 18 will likewise increase whereas, conversely, as the fluid pressure in the pilot chamber 16 decreases, the fluid pressure in the branch chamber 18 correspondingly decreases.

The relay means 15 is of the type disclosed and claimed in the aforementioned U.S. Pat. No. 3,575,190, to Puster et al., with certain improvements made therein which form the features of this invention, whereby only the details of the relay means 15 will be described to understand the features of the present invention with the understanding that for further information of the operation and details of the relay means 15, reference can be made to the aforementioned U.S. Pat. No. 3,575,190.

The direct acting relay means 15 comprises a housing means 20 formed from a plurality of housing plates 21, 22, 23 and 24 suitable secured together with sealing gasket means 25 disposed between the housing plates 21 and 22, sealing gasket means 26 disposed between the housing plates 22 and 23, and sealing gasket means 27 disposed between housing plates 23 and 24. The gasket means 25 cooperates with the housing plates 21 and 22 to define the pilot chamber 16 and exhaust chamber 17 on opposite sides thereof whereby the gasket means 25 also provides a flexible diaphragm means separating the pilot chamber 16 from the exhaust chamber 17. Similarly, the gasket means 26 forms a flexible diaphragm means between the exhaust chamber 17 and the branch chamber 18 except that the diaphragm means 26 has an opening 28 passing therethrough and aligned with an opening 29 passing through a spacer member 30 disposed between the diaphragm members 25 and 26 and having cross passages 31 therein always interconnecting the passage 29 and, thus, the opening 28 of the diaphragm 26 with the exhaust chamber 17.

The housing plate 23 has a wall 32 that separates the branch chamber 18 from the main chamber 19 and is provided with an opening 33 passing therethrough which defines a valve seat 34 projecting into the main chamber 19. A flexible valve member or disc 35 formed of rubber or other suitable flexible material is disposed in the main chamber 19 and has its outer peripheral portion 36 supported on a plurality of upwardly directed embossments or extensions 37 formed on the housing plate 24 so as to cause the central portion 38 of the valve member 35 to be slightly bowed downwardly while being held in sealed relation against the valve seat 34 to normally close the valve seat 34 from the main chamber 19 and, thus, the main chamber 19 from the branch chamber 18.

Figure 4:
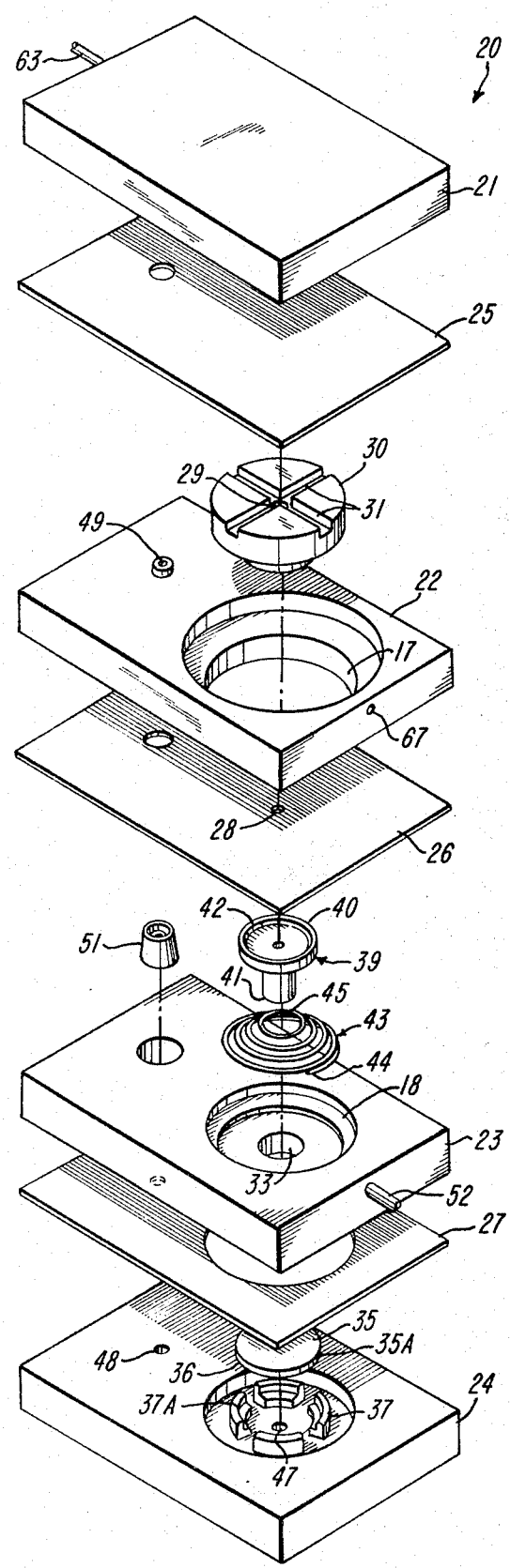
FIG. 4 is an exploded perspective view of the fluid control device of FIG. 2.

In particular, it can readily be seen in FIG. 4 that the abutments 37 of the housing plate 24 are disposed in a circular array that will be located outboard of the valve seat 34 and each has an L-shaped shoulder means 37A that receives the outer cylindrical peripheral side edge 35A of the valve member 35. The shoulder means 37A of the abutments 37 project into the main chamber 19 a certain distance so that through the thickness of the valve disc 35 and the distance that the valve seat 34 projects into the main chamber 19, the valve disc 35 is caused to be cupped or wrapped against and about the valve seat 34, when the relay means 15 is assembled together whereby the bias of the cupped valve member 35 tends to flatten the same in a direction toward the valve seat 34 to close the same. Thus, the valve member 35 supplies its own spring force or bias to close the valve seat 34.

A movable valve member 39 is disposed in the branch chamber 18 and has opposed ends 40 and 41 respectively adapted to be disposed in engagement with the diaphragm 26 outboard of the opening 28 thereof and with the central part 38 of the valve disc 35. The end 40 of the valve member 39 has an annular valve seat 42 thereon which surrounds the opening 28 of the diaphragm 26 and the end 41 of the valve member 39 is adapted to project through the opening 33 in the wall 32 of the plate 23 to engage against the central part 38 of the valve member 35. The valve member 39 has an opening 66 passing therethrough in aligned relation with the opening 28 of the diaphragm 26 and is adapted to be closed at the end 41 by the central part 38 of the valve member 35 when disposed thereagainst in the manner illustrated in FIG. 1. A compression spring 43 is disposed in the branch chamber 18 and has one end 44 thereof bearing against the wall 32 while the other end 45 bears against the valve member 39 to tend to maintain the end 40 thereof in engagement with the diaphragm 26 at all times as will be apparent hereinafter as the diaphragm 26 is moved relative to the housing means 20.

The fluid supply means 11 is adapted to be interconnected by a conduit means 46 to an opening 47 formed in the housing plate 24 and leading to the main chamber 19, the conduit means 46 also being interconnected to an opening 48 formed in the plate 24 and leading to a passage means 49 passing through the housing means 20 in such a manner that the same leads to a cross passage means 40 that is fluidly interconnected to the pilot chamber 16. The passage means 49 has a restrictor means 51 therein for a purpose hereinafter described.

The branch chamber 18 is adapted to be interconnected to a pneumatically operated device 12 by a conduit means 52 that is interconnected to an opening 53 in the plate 23 that leads to the branch chamber 18.

As previously described, the pneumatically operated device 12 can comprise an air-to-close valve means for operating a heat exchanger means such that the heat exchanger means 12 can be a heating unit that will increase its output heating effect as the branch pressure being supplied thereto from the branch chamber 18 decreases in pressure value to more open the valve means and conversely, will decrease the output heating effect as the branch pressure increases in pressure value to more close the valve means. Such air-to-close valve means can be utilized to permit more hot water to flow into a heat exchanger coil as the valve means opens and to decrease the flow of hot water as the valve means is moved to a more closing position.

The condition responsive fluid bleed means 14 comprises a housing means 54 formed of a plurality of housing plates 55, 56, and 57 suitably secured together in any suitable manner with gasket means 58 and 59 therebetween, the housing means 54 having a passage means 60 formed therein and interconnecting with a frusto-conical valve seat 61 at one end thereof which leads to the atmosphere and to a passage 62 formed at the other end thereof and leading to a conduit means 63 that is adapted to be interconnected to the passage 50 of the relay means 15 in the manner illustrated in FIG. 1. The passage means 60 has a suitable filter 63' disposed therein for filtering any fluid movement through the passage means 60.

A ball valve member 64 is disposed in the frusto-conical valve seat 61 and is held in the same by a bimetal member 65 that has its right-hand end adjustably fixed to the housing means 54 in any suitable manner so that the left-hand end is cantilevered and contacts the ball valve 64 while being adapted to warp toward and away from the valve seat 61 in accordance with the temperature being sensed thereby. For example, when the heat exchanger means 12 is a heat producing heat exchanger means and has its output temperature effect decreased as the branch pressure being supplied thereto from the branch chamber 18 increases, the bimetal member 65 is so constructed and arranged that the same is direct acting in a manner to warp downwardly toward the valve seat 61 as the output temperature effect sensed thereby increases to thereby decrease the amount of bleed through the ball valve means 64, 61 as the output temperature effect of the heater means 12 increases.

The operation of the control system 10 will now be described.

As previously stated, it will be assumed that the heat exchanger means 12 will have its output temperature effect decreased as the fluid pressure being supplied thereto from the branch chamber 18 increases and the bimetal member 65 tends to warp downwardly against the ball valve 64 with a greater force as the same senses increasing temperature and with a lesser force as the bimetal member 65 senses a decreasing temperature from a set temperature setting thereof.

It can be seen that the fluid supply means 11 is adapted to supply fluid pressure to the main chamber 19 as well as through the restrictor 51 to the pilot chamber 16 whereby as the fluid pressure in the pilot chamber 16 builds up, the same also acts in the passage means 60 of the condition responsive fluid bleed means 14 to tend to open the ball valve member 64 away from the valve seat 61 and, thus, bleed the fluid pressure in the pilot chamber 16 to the atmosphere. However, opening movement of the valve member 64 is opposed by the spring force of the bimetal member 65 such that the spring force of the bimetal member 65 urging the ball valve 64 against the valve seat 61 decreases as the temperature sensed by the bimetal member 65 decreased from the set temperature thereof and, conversely, the spring force of the bimetal member 64 increases to hold the valve member 64 against the valve seat 61 as the temperature of the bimetal valve member 65 increases from the set temperature thereof. Thus, there is adapted to be more fluid bleeding through the ball valve 64, 61 as the temperature decreases and less fluid bleeding as the temperature increases.

Figure 2:
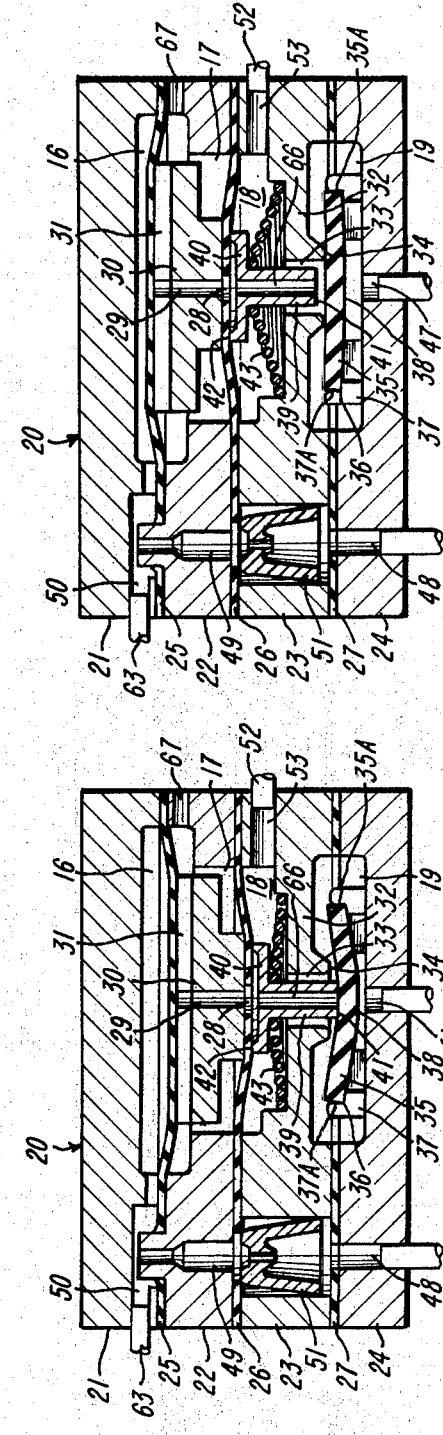
FIG. 2 illustrates the fluid control device of FIG. 1 in cross section and with the same being in one operating position thereof.

As the pressure of the fluid in the pilot chamber 16 increases, the same acts downwardly on the diaphragm 25, and through the separator member 30, on the diaphragm 26 and, thus, on the valve member 39 to urge the same downwardly against the natural bias of the valve disc 35 to tend to open the central portion 38 of the valve disc 35 from the valve seat 34 and, thus, interconnect the main chamber 19 with the branch chamber 18 to thereby increase the pressure value of the pressure fluid in the branch chamber 18 in the manner illustrated in FIG. 2. Conversely, as the pressure in the pilot chamber 16 decreases, the pressure in the branch chamber 18 acting upwardly on the diaphragm 26 moves the diaphragm 26 upwardly and since the spring 43 is holding the valve member 39 against the diaphragm 26, the valve member 39 moves upwardly in unison therewith to permit the valve disc 35 to be disposed against the valve seat 34 and, thus, disconnect the main chamber 19 from the branch chamber 18. Further upward movement of the diaphragm 26 causes the valve member 39 to move the end 41 thereof away from the valve disc 35 so as to open the end 41 of the valve member 39 and permit the fluid pressure in the branch chamber 18 to exhaust through the opening 66 of the valve member 39, opening 28 of the diaphragm 26 and passages 29 and 31 of the separating member 30 to pass out to the atmosphere through an opening 67 formed in the housing plate 22 and leading from the exhaust chamber 17 to the atmosphere as illustrated in FIG. 3.

Thus, should the heating effect produced by the heat exchanging means 12 be at the level of the particular setting of the bimetal member 65, the relay means 15 will assume the satisfied position illustrated in FIG. 1 wherein both the exhaust chamber 17 and main chamber 19 are disconnected from the branch chamber 18 and with the branch chamber 18 providing its output branch signal at a pressure level to maintain the heat exchanger means 12 at the particular operating condition thereof because the pressure in the pilot chamber 16 remains at a pressure level to maintain the relay means 15 in the satisfied condition illustrated in FIG. 1 as the condition responsive fluid bleed means 14 is bleeding the chamber 16 at a rate that is constantly being resupplied by the supply means 11 through the restrictor means 51.

Figure 3:
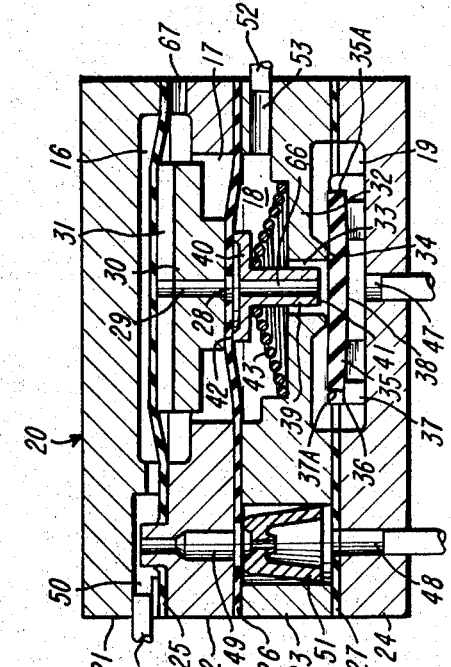
FIG. 3 is a view similar to FIG. 2 and illustrates the control device in another operating position thereof.

However, should the output temperature effect of the heat exchanger means 12 fall below the desired output temperature effect setting of the bimetal means 65, the bimetal means 65 will warp upwardly and thereby increase the amount of bleed through the valve seat 61 so that the fluid pressure in the pilot chamber 16 will decrease as the fluid pressure therein will not be replaced at a sufficiently rapid rate through the restrictor means 51 whereby the force of the pressure fluid in the branch chamber 18 will act upwardly on the diaphragm 26 and move the diaphragm 26 upwardly, and, thus, open the end 41 of the valve member 39 to interconnect the branch chamber 18 to the exhaust chamber 17 as illustrated in FIG. 3. Thus, the pressure in the branch chamber 18 is decreased to cause the heat exchanger means 12 to increase its output temperature effect until the bimetal member 65 again senses that the output temperature effect is now correct and maintains the ball valve member 64 in a manner to bleed the chamber 16 at a rate to maintain the relay means 15 in the satisfied condition illustrated in FIG. 1.

Conversely, should the output temperature effect of the heat exchanger means 12 increase beyond the set output temperature effect of the bimetal member 65, the bimetal member 65 warps downwardly and, thus, decreases the amount of fluid bleed through the valve seat 61 whereby the fluid pressure in the pilot chamber 16 correspondingly increases. The increase in fluid pressure in the pilot chamber 16 moves the diaphragms 25 and 26 downwardly and through the valve member 39 moves the central portion 38 of the valve disc 35 away from the valve seat 34 to permit main pressure from the chamber 19 to enter into the branch chamber 18 through now opened valve seat 34 and, thus, increase the force of the pressure in the branch chamber 18 as illustrated in FIG. 3. This increase in the force in the pressure value of the fluid in the branch chamber 18 causes the heat exchanger means 12 to decrease its output temperature effect so that the bimetal member 65 will eventually decrease in temperature thereof and thereby warp upwardly so that the ball valve member 64 will again bleed the pilot chamber 16 in such a manner that the relay means 15 will again return to the satisfied condition illustrated in FIG. 1 whereby the heat exchanger means 12 will produce the necessary output effect to maintain the bimetal member 65 in the satisfied condition illustrated in FIG. 1.

Therefore, it can be seen that the control system 10 operates in such a manner that the pilot chamber 16 thereof has its fluid pressure bled in accordance with the condition being sensed by the condition responsive means 14 to operate the pneumatically operated device 12 in relation to the particular pressure value existing in the pilot chamber 16. It can also be seen that the valve member 35 of the relay means 15 of this invention provides its own spring force for closing the valve seat 34.

Should it be desired to utilize the system 10 for operating the heat exchanger means 12 in a reverse manner, such as by having the heat exchanger means 12 comprise a cooling device where the air-to-close valve controls the flow of chilled water into the heat exchanger coil so that the output cooling effect decreases upon an increase in the branch pressure being directed thereto and its output cooling effect increases upon a decrease in the branch pressure being directed thereto, the bimetal member 65 of the fluid bleed means 14 can be merely turned over on the housing means 54 so that the same will tend to warp upwardly as the same increases in temperature and warp downwardly as the same decreases in temperature. Thus, more fluid pressure is bled from the pilot chamber 16 by the fluid bleed means 14 as the output temperature effect of the heat exchanger decreases from the temperature setting of the bimetal member 65 and less fluid pressure is bled from the pilot chamber 16 as the output temperature effect of the heat exchanger means 12 increases from the temperature setting of the bimetal member 65.

Thus, when the output cooling effect provided by the heat exchanger means 12 is satisfying the set temperature condition of the bimetal member 65, the relay means 14 is in the satisfied condition illustrated in FIG. 1. However, upon an increase in temperature being sensed by the bimetal member 65 over the desired temperature setting thereof, the bimetal member 65 warps upwardly to thereby increase the amount of bleed through the valve seat 61 and thereby decrease the pressure value in the pilot chamber 16. Thus, the diaphragm means 25 and 26 move upwardly to cause the valve member 39 to open its end 41 away from the valve disc 35 so that the pressure in the branch chamber 18 will be exhausted to the exhaust chamber 17 and thereby decrease the value of the pressure signal being directed to the heat exchanger means 12 to thereby cause the heat exchanger means 12 to increase its output cooling effect. Conversely, should the output cooling effect of the heat exchanger means 12 be below the temperature setting for the bimetal member 65, the bimetal member 65 warps downwardly to decrease the amount of bleed through the valve seat 61 and thereby permit the pressure value in the pilot chamber 16 to increase to cause the valve member 39 to move downwardly and open the valve disc 35 away from the valve seat 34 to interconnect the main chamber 19 with the branch chamber 18. In this manner, an increase in the pressure value in the branch chamber 18 causes the heat exchanger means 12 to reduce its output cooling effect so that the bimetal member 65 will tend to return to the satisfied condition illustrated in FIG. 1 to maintain the valve means 15 in the satisfied condition illustrated in FIG. 1.

Therefore, it can be seen that the control system 10 is adapted to operate either a heating or cooling heat exchanger means and, of course, the fluid operated device 12 could have its output heating temperature effect increase upon an increase in pressure thereto rather than upon a decrease in pressure thereto as previously described as the valve means being controlled by the branch pressure from the branch chamber 18 could be an air-to-open valve means.

While the form and method of this invention now preferred have been disclosed and described as required by the Patent Statutes, it is to be understood that other forms and methods can be utilized that will still come within the scope of the appended claims.

What is claimed is:

1. A fluid control device comprising a housing means having first and second chambers interconnected together by a valve seat, a flexible valve member disposed in said first chamber for opening and closing said valve seat, said valve member and said housing means being so constructed and arranged that said valve member itself has a bias thereof that tends to cause said valve member to close said valve seat, and a movable actuator disposed in said second chamber and being adapted to project through said valve seat and engage said valve member to urge the same away from said valve seat to open said valve seat in opposition to the bias of said valve member, said housing means having engaging means in said first chamber engaging against said valve member to tend to cup said valve member against and about said valve seat so that the natural bias of said cupped valve member is to tend to flatten the same in a direction toward said valve seat whereby said valve member has said bias that normally closes said valve seat, said engaging means engaging said valve member outboard of said valve seat and on the side of said valve member that faces away from said valve seat, said engaging means comprising a plurality of spaced apart abutments of said housing means that extend into said first chamber in a substantially continuous array outboard of said valve seat, said abutments being disposed in a circular array outboard of said valve seat, said valve member comprising a circular disc having a substantially cylindrical peripheral edge, said abutments having shoulder means thereon that are L-shaped in cross section for receiving said edge of said disc for positioning said disc relative to said valve seat.

2. A fluid control device as set forth in claim 1 wherein said valve member has an outer peripheral edge completely surrounded by said first chamber.

3. A fluid control device as set forth in claim 1 wherein said actuator comprises a movable valve seat that is opened and closed by said valve member.

4. In a fluid control system having a fluid source and a fluid operated device to be controlled by a fluid operated relay having a branch chamber interconnected to said fluid operated device and a main chamber interconnected to said source, the improvement wherein a housing means of said relay has said main and branch chambers interconnected together by a valve seat, a flexible valve member disposed in said main chamber for opening and closing said valve seat, said valve member and said housing means being so constructed and arranged that said valve member itself has a bias thereof that tends to cause said valve member to close said valve seat, and a movable actuator disposed in said branch chamber and being adapted to project through said valve seat and engage said valve member to urge the same away from said valve seat to open said valve seat in opposition to the bias of said valve member, said housing means having engaging means in said main chamber engaging against said valve member to tend to cup said valve member against and about said valve seat so that the natural bias of said cupped valve member is to tend to flatten the same in a direction toward said valve seat whereby said valve member has said bias that normally closes said valve seat, said engaging means engage said valve member outboard of said valve seat and on the side of said valve member that faces away from said valve seat, said engaging means comprising a plurality of spaced apart abutments of said housing means that extend into said main chamber in a substantially continuous array outboard of said valve seat, said abutments being disposed in a circular array outboard of said valve seat, said valve member comprising a circular disc having a substantially cylindrical peripheral edge, said abutments having shoulder means thereon that are L-shaped in cross section for receiving said edge of said disc for positioning said disc relative to said valve seat.

5. In a fluid control system as set forth in claim 4, the further improvement wherein said valve member has an outer peripheral edge completely surrounded by said main chamber.

6. In a fluid control system as set forth in claim 4, the further improvement wherein said actuator comprises a movable valve seat that is opened and closed by said valve member and leads to an exhaust chamber of said relay.

* * * * *